United States Patent [19]

Gu

[11] Patent Number: 5,792,381

[45] Date of Patent: Aug. 11, 1998

[54] NONAZEOTROPIC WORKING FLUID MEDIA FOR USE IN THERMODYNAMIC CYCLE APPLICATIONS

[76] Inventor: Chujun Gu, No. A7 South Road Liuliqiao, Beijing, China, 100073

[21] Appl. No.: 486,992

[22] Filed: Jun. 7, 1995

Related U.S. Application Data

[62] Division of Ser. No. 7,398, Jan. 21, 1993, abandoned.

[30] Foreign Application Priority Data

Jan. 24, 1992 [CN] China ..................... 92100395

[51] Int. Cl.$^6$ .................................................. C09K 5/04
[52] U.S. Cl. ................................. 252/67; 62/114
[58] Field of Search .......................... 252/67; 62/114

[56] References Cited

U.S. PATENT DOCUMENTS 4,810,403  3/1989  Bivens et al. ........................ 252/67

FOREIGN PATENT DOCUMENTS 1-247479  10/1989  Japan .
473740    9/1975   Russian Federation .

*Primary Examiner*—Christine Skane
*Attorney, Agent, or Firm*—Pennie & Edmonds LLP

[57] ABSTRACT

A nonazeotropic working fluid medium for use in a thermodynamic cycle system, comprising a mixture of compounds and characterized in that one or more vaporization loss/replenishment cycles of each less than about 15% of the total weight of the medium and cumulative up to about 50% of the total weight of the medium result in a total decrease in the coefficient of performance of said medium of no more than about 5%, or a loss in electric power generating efficiency of not more than about 3 percent.

2 Claims, 1 Drawing Sheet

NONAZEOTROPIC WORKING FLUID MEDIA FOR USE IN THERMODYNAMIC CYCLE APPLICATIONS

This is a division of application Ser. No. 08/007,398, filed Jan. 21, 1993, which is a continuation-in-part application of 07/854,131 filed Mar. 19, 1992.

TECHNICAL FIELD

The present invention relates to working fluid media for use in thermodynamic cycle systems. More particularly, it relates to nonazeotropic mixtures useful, for example, in refrigeration and air-conditioning applications and having improved vaporization loss characteristics.

BACKGROUND ART

Commercial and industrial working fluid media for thermodynamic cycle systems are fluids which are generally either pure compounds, azeotropes, or nonazeotropes (zeotropes).

Many such mixtures are known in the art as illustrated, for example, in the following references:

Lewis, U.S. Pat. No. 2,641,580, granted Jun. 9, 1953, for "Azeotropic Refrigerant Composition of 1,1-Difluoroethane and Monochloropentafluoroethane".

Fuderer, U.S. Pat. No. 3,203,194, granted Aug. 31, 1965, for "Compression Process for Refrigeration".

Orfeo et al., U.S. Pat. No. 4,303,536, granted Dec. 1, 1981, for "Nonazeotropic Refrigerant Composition Containing Monochlorodifluoromethane, And Method Of Use".

Nikolsky et al., U.S. Pat. No. 4,603,002, granted Jul. 29, 1986, for "Method And Cooling Agent For Freezing And Storing Products".

Japanese Patent Kokai 52-70466, published in 1977 to Daikin Kogyo KK, for "Low Boiling Point Refrigerant Compositions".

B.C. Langley, "Refrigeration and Air Conditioning", 2d ed. 1982.

French Patent 2,130,556 (VEB Monsator Haushalt grossgeratekombinat).

French Patent 2,177,785 (VEB Monsator Haushalt grossgeratekombinat).

French Patent 2,607,144 (Institute Francaise du Petrole).

M. F. Bouzianis, "Chlorofluorocarbons And Their Alternatives" (Arthur D. Little 1988).

D. J. Bateman et al., "Refrigerant Blends for the Automotive Air Conditioning Aftermarket," SAE Technical Paper Series 900216 (SAE International Congress and Exposition - Detroit, Mich.; Feb. 26–Mar. 2, 1990).

"ASHRAE Terminology of Heating, Ventilation, Air-conditioning and Refrigeration", 2nd ed. (American Society of Heating, Refrigeration, and Air-Conditioning Engineers Inc. 1991).

Nonazeotropic refrigeration media ("NARMs") in particular are attractive because, during the thermodynamic cycle process, they absorb more heat during the isobaric evaporation stage, release more heat during the isobaric condensation stage, and do more work during the expansion process or need less work during the compression stage than do either single-compound or azeotropic working fluid media under comparable external conditions. In other words, NARMs have a higher "coefficient of performance" (defined hereinbelow) in an inverse thermodynamic cycle device, and higher work efficiency in a normal thermodynamic cycle device.

However, known nonazeotropic working fluid media have serious drawbacks stemming from the fact that in mechanical refrigeration, air conditioning, heat pump and hot-fluid power generation systems, vaporization loss of such media is unavoidable. This results not only in changes in the concentrations of the components of the liquid phase of the working fluid media, but also results in a decrease in the weight or mass of the working fluid medium. In turn, there is a continuous decrease in the Coefficient of Performance ("COP") and a decrease in the power generating efficiency of hot-fluid power generation systems. (The term "COP" as used herein is the ratio of the rate of net energy removal from the environment (in the case of a refrigerant) or net energy output (in the case of a heating or power generating system) to the total energy input expressed in consistent units and rating conditions). Because of this, it is necessary to replenish the working fluid to its original weight level.

But with conventional NARMs, the replenished working fluid medium has a different composition than the original working medium after vaporization losses. This result stems from changes in the system concentration, which are attributable to recharging with original nonazeotropic medium, which mixes with a partially depleted liquid working fluid whose composition had changed due to zeotropic vaporization. Such mixing, therefore, leads to a different concentration of the final working fluid medium than the original working medium, and results in a continuing decrease in the COP and a decrease in power generating efficiency.

Consequently, the changes in proportions (concentrations) of the components of the working fluid medium make its useful life much shorter than if its composition had remained unchanged. Inevitably the entire working fluid medium has to be discharged and replaced. Because conventional NARMs have ozone depletion potential ("ODP"), and are toxic, especially when discharged in such large quantities, the continued use of conventional NARMs is having and will continue to have deleterious effects on the ozone layer and the environment. To avoid such problems and drawbacks requires large investments in recycling systems or the discovery of new ways of handling conventional NARMs that have to be discharged in this way. Neither approach is entirely satisfactory from a technical, economic or environmental standpoint.

Therefore, a need definitely exists for nonazeotropic working fluid media useful in thermodynamic cycle systems and having extended useful working life, with little decrease in COP and little decrease in power generating efficiency during repeated vaporization loss and replenishment cycle processes.

Accordingly, it is an object of the present invention to provide nonazeotropic fluid working media for use in thermodynamic compression cycle systems, which media are improved with respect to anti-vaporization loss properties with respect to the effect on COP of changes in the composition of the medium resulting from repeated vaporization loss and replenishment cycles.

Another object is to provide refrigeration, air conditioning, heating and power generation systems using hot fluid and the like devices employing the aforesaid improved, nonazeotropic working fluid media.

Another object is to provide a thermodynamic engineering device operated as a thermodynamic cycle system employing a nonazeotropic working fluid medium having improved vaporization loss stability.

Another object is to provide an air conditioning device operated as a thermodynamic cycle system employing a nonazeotropic working fluid medium having improved vaporization loss stability.

Another object is to provide a heating device operated as a thermodynamic cycle system employing a nonazeotropic working fluid medium having improved vaporization loss stability.

Yet another object is to provide a method of transferring heat by means of a thermodynamic compression cycle utilizing the aforesaid improved non-azeotropic working media of the present invention.

These and other objects of the invention can be understood and achieved by reference to the following disclosure, drawings and claims.

SUMMARY OF THE INVENTION

The above objects are achieved according to the present invention by a nonazeotropic working fluid medium for a thermodynamic cycle system, comprising a mixture of compounds capable of undergoing one or more vaporization loss-replenishment cycles wherein: a) after—any single cycle, the change in weight of the medium is less than about 15 percent of the original total weight of the medium; and b) cumulatively, over all cycles, the change in weight of the medium is no more than about 50 percent of the original total weight of the medium, resulting in i) a total decrease in the COP of said medium of not more than about 5 percent; or ii) a loss in electric power generating ability of not more than about 3 percent.

Preferably, the compounds constituting the aforesaid working medium of the invention are $CHClF_2$ and one or more compounds of the formula $C_2H_xX_y$ wherein x and y are integers, y is greater than 1, the sum of x and y is 6, and each X in a given compound can independently be a chlorine (Cl) or fluorine (F) radical. The compounds are either commercially available or can be readily prepared by methods well-known in the organic chemistry art. Examples of such compounds are $CH_3CHF_2$ and $CClF_2CF_3$.

In another preferred aspect of the invention, the fluid working medium comprises additionally one or more compounds of the type $C_4H_{10}$ and $CH_mCl_nF_3$ wherein m and n are integers and m+n=1, i.e., either m or n is 1 and the other is 0. Examples of compounds of the formula $C_4H_{10}$ are n-butane and iso-butane. Examples of compounds of the formula $CH_mCl_nF_3$ are chlorotrifluoromethane and trifluoromethane.

BRIEF DESCRIPTION OF THE DRAWINGS

Reference is made to the accompanying drawings wherein.

DESCRIPTION OF PREFERRED EMBODIMENTS

The fluid working media of the present invention are useful in thermodynamic compression-condensation-expansion-evaporation cycles, for example, "heat pump" applications including refrigeration (chilling), air conditioning, heating, and electrical power generating (hot fluid) systems, without the need for expensive modification of existing systems. The working media comprise at least two fluorocarbons, the total mixture being nonazeotropic and having a desirable coefficient of performance which is maintained within 95 percent of its original value after repeated vaporization loss-replenishment cycles amounting to up to 50 percent change in the original weight of the medium, notwithstanding the changes in the composition of the medium stemming from such vaporization loss-replenishment cycles, and a loss in hot fluid power generating efficiency of not more than about 3 percent.

Figure 1:
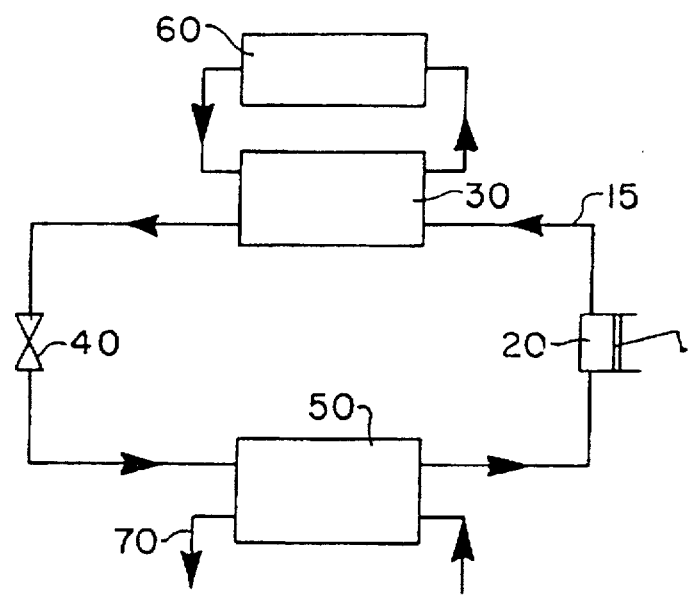
FIG. 1 is a schematic diagram of a refrigeration unit which utilizes the nonazeotropic fluid working medium of the invention.

Referring to the refrigeration unit shown in FIG. 1 of the drawings, the fluid working medium of the invention circulates within the fluid circuit 15 in the direction of the arrows. The fluid circuit 15 interconnects a compressor 20, a condenser 30, a throttle 40 and an evaporator 50. The condenser 30 is connected, via a heat exchanger, to a heat removing means, for example cooling water supply 60. The evaporator 50 can be provided in a controlled space for removal of heat from that space or may be connected, via a heat exchanger, to a low temperature fluid circuit 70 in order to provide cooling at a location spaced from the evaporator 50.

Figure 2:
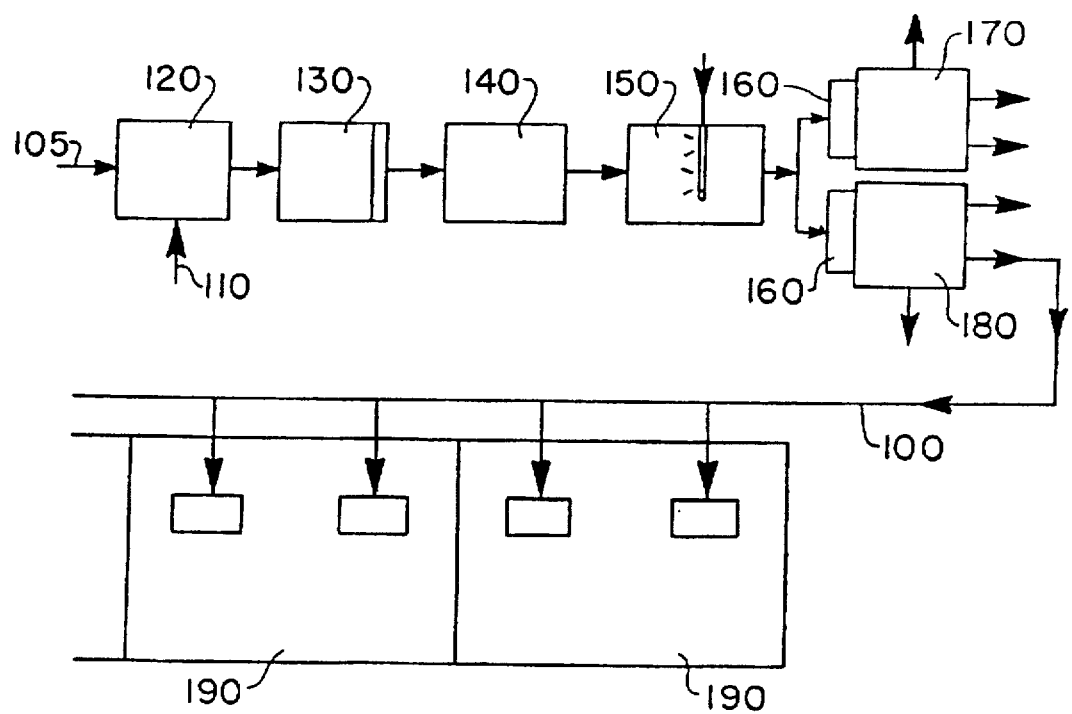
FIG. 2 is a schematic diagram of an air conditioning device utilizing the refrigeration unit of FIG. 1.

Referring to FIG. 2 of the drawings, an air-conditioning system according to the present invention includes a refrigerating unit 140 of the type shown in FIG. 1 and a fluid circuit 100. The circuit is provided with fresh air intakes and recirculated air intakes 105 and 110, which are mixed in a mixer 120, a fan-and-filter 130, a cooling/refrigerating device 140 similar to that shown in FIG. 1, a humidifier 150, zone heaters 160 connected to fluid dividers 170 and 180, each of which feeds zoned compartments 190.

Preferred compositions of the fluid working media of the present invention are illustrated by way of the following non-limiting examples.

Example 1

A nonazeotropic working fluid medium having vaporization loss stability is formulated from the compound $CHClF_2$ and one or more compounds of $C_2H_xX_y$ wherein x and y are integers, y is greater than 1, the sum of x and y is 6, and each X in a given compound can be independently a chlorine (Cl) or fluorine (F) radical.

Example 2

A nonazeotropic working fluid medium having vaporization loss stability is formulated by admixture of the compound $CHClF_2$(R22) and two other compounds X and Y of the formula $C_nH_mCl_xF_y$, wherein n is an integer, and m, x and y are each independently integers of 0 or more, but m, x and y are not 0 at the same time, each of said two other compounds X and Y having a normal boiling point within one of the following seven ranges (A–G):

A. –41° C. to –35° C.

B. –35° C. to –20° C.

C. –20° C. to 0° C.

D. 0° C. to 25° C.

E. 25° C. to 35° C.

F. 55° C. to 90° C.

G. 90° C. to 135° C.

Depending on the boiling points of the compounds (R22, X, Y), the weight percent proportions of the compounds in the medium are as follows:

| | No two Cpds. in same b.p. range | Two Cpds. in same b.p. range |
|---|---|---|
| b.p. of X < Y and each is in range A | R22 > 0.45<br>0.01 < X < 0.53<br>0.01 < Y < 0.53 | R22 > 0.40<br>0.01 < X < 0.58<br>0.01 < Y < 0.58 |
| b.p. of X < Y and one in range B | R22 > 0.46<br>0.01 < X < 0.52<br>0.01 < Y < 0.52 | R22 > 0.41<br>0.01 < X < 0.57<br>0.01 < Y < 0.57 |
| b.p. of X < Y < and the b.p. of X is in range B, the b.p. of Y is in range C. | R22 > 0.47<br>0.01 < X < 0.51<br>0.01 < Y < 0.51 | R22 > 0.42<br>0.01 < X < 0.56<br>0.01 < Y < 0.56 |
| b.p. of X is at least in range B<br>b.p. of Y is at least in range D | R22 > 0.50<br>0.01 < X < 0.48<br>0.01 < Y < 0.48 | R22 > 0.45<br>0.01 < X < 0.53<br>0.01 < Y < 0.53 |

Example 3

A nonazeotropic working fluid medium having vaporization loss stability is formulated from the compounds $CHClF_2$ (R22) and three other compounds X, Y and Z of the formula $C_nH_mCl_xF_y$ wherein n is an integer, x and y are each independently integers of 0 or more, but m, x and y are not 0 at the same time, each of said three other compounds X, Y and Z having a normal boiling point within one of the following seven ranges (A–G):

A. −41° C. to −35° C.

B. −35° C. to −20° C.

C. −20° C. to 0° C.

D. 0° C. to 25° C.

E. 25° C. to 35° C.

F. 55° C. to 90° C.

G. 90° C. to 135° C.

Accordingly, whether the boiling point of the compounds (R22, X, Y, Z) is in the same range or not, two cases can be created, wherein either no two of said compounds (R22, X, Y, Z) have normal boiling points within the same range or at least two have normal boiling points within the same range, but the total system does not have a boiling point within that range, whereby the concentrations of the compounds in the medium are as follows:

| | No two Cpds. in same b.p. range | Two Cpds. in same b.p. range |
|---|---|---|
| b.p. of X < Y < Z and each is in range A | R22 > 0.35<br>0.01 < X < 0.60<br>0.01 < Y < 0.60<br>0.01 < Z < 0.60 | R22 > 0.32<br>0.01 < X < 0.63<br>0.01 < Y < 0.63<br>0.01 < Z < 0.63 |
| b.p. of X < Y < Z and each is in range B | R22 > 0.36<br>0.01 < X < 0.59<br>0.01 < Y < 0.59<br>0.01 < Z < 0.59 | R22 > 0.33<br>0.01 < X < 0.62<br>0.01 < Y < 0.62<br>0.01 < Z < 0.62 |
| b.p. of X < Y < Z and each is in range B or at least one is in range C | R22 > 0.37<br>0.01 < X < 0.58<br>0.01 < Y < 0.58<br>0.01 < Z < 0.58 | R22 > 0.34<br>0.01 < X < 0.61<br>0.01 < Y < 0.61<br>0.01 < Z < 0.61 |
| b.p. of X < Y < Z, and b.p.'s of X and Y are at least in range B, and b.p. of Z is at least in range D | R22 > 0.40<br>0.01 < X < 0.55<br>0.01 < Y < 0.55<br>0.01 < Z < 0.55 | R22 > 0.37<br>0.01 < X < 0.58<br>0.01 < Y < 0.58<br>0.01 < Z < 0.58 |

Example 4

A nonazeotropic working fluid medium having vaporization loss stability is formulated from the compounds $CHClF_2$ (R22) and four other compounds U, X, Y and Z of the formula $C_nH_mCl_xF_y$ wherein n is an integer, m, x and y are each independently integers of 0 or more, but m, x and y are not 0 at the same time, each of said four other compounds U, X, Y and Z having a normal boiling point within one of the following seven ranges (A–G):

A. −41° C. to −35° C.

B. −35° C. to −20° C.

C. −20° C. to 0° C.

D. 0° C. to 25° C.

E. 25° C. to 35° C.

F. 55° C. to 90° C.

G. 90° C. to 135° C.

Accordingly, whether the boiling point of the compounds (R22, U, X, Y, Z) is in the same range or not, two cases can be created, wherein either no two of said compounds (R22, U, X, Y, Z) have normal boiling points within in the same range or at least two have normal boiling points within the same range, but the total system does not have a boiling point within that range, whereby the concentrations of the compounds in the medium are as follows:

| | No two Cpds. in same b.p. range | Two cpds. in same b.p. range |
|---|---|---|
| b.p. of U < X < Y < Z and each is in range A | R22 > 0.33<br>0.01 < U < 0.62<br>0.01 < X < 0.62<br>0.01 < Y < 0.62<br>0.01 < Z < 0.62 | R22 > 0.3<br>0.01 < U < 0.65<br>0.01 < X < 0.65<br>0.01 < Y < 0.65<br>0.01 < Z < 0.65 |
| b.p. of U < X < Y < Z and each is in range B | R22 > 0.34<br>0.01 < U < 0.61<br>0.01 < X < 0.61<br>0.01 < Y < 0.61<br>0.01 < Z < 0.61 | R22 > 0.31<br>0.01 < U < 0.64<br>0.01 < X < 0.64<br>0.01 < Y < 0.64<br>0.01 < Z < 0.64 |
| b.p. of U < X < Y < Z and each is in range B or at least one is in range C | R22 > 0.35<br>0.01 < U < 0.60<br>0.01 < X < 0.60<br>0.01 < Y < 0.60<br>0.01 < Z < 0.60 | R22 > 0.32<br>0.01 < U < 0.63<br>0.01 < X < 0.63<br>0.01 < Y < 0.63<br>0.01 < Z < 0.63 |
| b.p. of U < X < Y < Z, and b.p. of U, X and Y are at least in range B, and b.p. of Z is at least in range D | R22 > 0.38<br>0.01 < U < 0.57<br>0.01 < X < 0.57<br>0.01 < Y < 0.57<br>0.01 < Z < 0.57 | R22 > 0.35<br>0.01 < U < 0.60<br>0.01 < X < 0.60<br>0.01 < Y < 0.60<br>0.01 < Z < 0.60 |

Example 5

A nonazeotropic working fluid medium having vaporization loss stability is formulated from the compounds $CHClF_2$(R22) and four or more other compounds X1, X2, X3, . . . , Xn of the formula $C_nH_mCl_xF_y$ wherein n is the integer, m, x, and y are each independently integers of 0 or more, but m, x and y are not 0 at the same time, each of said four or more other compounds X1, X2, X3, . . . , Xn having a normal boiling point within one of the following seven ranges (A–G):

A. −41° to −35° C.

B. −35° to −20° C.

C. −20° to 0° C.

D. 0° to 25° C.

E. 25° to 35° C.

F. 55° to 90° C.

G. 90° to 135° C.

Accordingly, whether the boiling point of the compounds (R22,X1,X2,X3 . . . , Xn) is in the same range or not, two cases can be created, wherein either no two of said compounds (R22,X1,X2,X3, . . . , Xn) have normal boiling points with the same range or at least two have normal boiling points within the same range, but the total system does not have a boiling point within that range, whereby the concentrations of the compounds in the medium are as follows:

|  | No two Cpds. in same b.p. range | Two Cpds. in same b.p. range |
|---|---|---|
| b.p. of | R22 > 0.33 | R22 > 0.30 |
| X1 < X2 < X3 < ... < Xn | $0.01 < X1 < (0.67 - N \times 0.01)$ | $0.01 < X1 < (0.70 - N \times 0.01)$ |
| and each is in range A | $0.01 < X2 < (0.67 - N \times 0.01)$ | $0.01 < X2 < (0.70 - N \times 0.01)$ |
|  | $0.01 < X3 < (0.67 - N \times 0.01)$ | $0.01 < X3 < (0.70 - N \times 0.01)$ |
|  | $0.01 < Xn < (0.67 - N \times 0.01$ | $0.01 < Xn < (0.70 - N \times 0.01)$ |
| b.p. of | R22 > 0.34 | R22 > 0.31 |
| X1 < X2 < X3 < ... < Xn | $0.01 < X1 < (0.66 - N \times 0.01)$ | $0.01 < X1 < (0.69 - N \times 0.01)$ |
| and each is in range B | $0.01 < X2 < (0.66 - N \times 0.01)$ | $0.01 < X2 < (0.69 - N \times 0.01)$ |
|  | $0.01 < X3 < (0.66 - N \times 0.01)$ | $0.01 < X3 < (0.69 - N \times 0.01)$ |
|  | $0.01 < Xn < (0.66 - N \times 0.01)$ | $0.01 < Xn < (0.69 - N \times 0.01)$ |
| b.p. of | R22 > 0.35 | R22 > 0.32 |
| X1 < X2 < X3 < ... < Xn, | $0.01 < X1 < (0.65 - N \times 0.01)$ | $0.01 < X1 < (0.68 - N \times 0.01)$ |
| with at least one in | $0.01 < X2 < (0.65 - N \times 0.01)$ | $0.01 < X2 < (0.68 - N \times 0.01)$ |
| range C and the others | $0.01 < X3 < (0.65 - N \times 0.01)$ | $0.01 < X3 < (0.68 - N \times 0.01)$ |
| in range B | $0.01 < Xn < (0.65 - N \times 0.01)$ | $0.01 < Xn < (0.68 - N \times 0.01)$ |
| b.p. of | R22 > 0.38 | R22 > 0.35 |
| X1 < X2 < X3 < ... < Xn, | $0.01 < X1 < (0.62 - N \times 0.01)$ | $0.01 < X1 < (0.65 - N \times 0.01)$ |
| and b.p.'s of | $0.01 < X2 < (0.62 - N \times 0.01)$ | $0.01 < X2 < (0.65 - N \times 0.01)$ |
| X1, X2, X3, ..., | $0.01 < X3 < (0.62 - N \times 0.01)$ | $0.01 < X3 < (0.65 - N \times 0.01)$ |
| Xi(3 < i < n) are at least | $0.01 < Xn < (0.62 - N \times 0.01)$ | $0.01 < Xn < (0.65 - N \times 0.01)$ |
| in range B and the |  |  |
| b.p.'s of X(i + 1), ..., Xn |  |  |
| are at least in range D |  |  |

Example 6

A nonazeotropic working fluid medium having vaporization loss stability is formulated from three compounds P,X and Y of the formula $C_nH_mCl_xF_y$ wherein n is an integer, and m,x and y are each independently integers of 0 or more, but m,x and y are not 0 at the same time. The boiling point of P is the lowest, with each of the remaining compounds X and Y having a normal boiling point within one of the following seven ranges (A–G):

A. −45° to −35° C.

B. −35° to −20° C.

C. −20° to 0° C.

D. 0° to 25° C.

E. 25° to 35° C.

F. 55° to 90° C.

G. 90° to 135° C.

Accordingly, whether the boiling point of the compounds (P,X,Y) is in the same range or not, two cases can be created, wherein either no two of said compounds (P,X,Y) have normal boiling points within the same range or at least two have normal boiling points within the same range, but the total system does not have a boiling point within that range, whereby the concentrations of the compounds in the medium are as follows:

|  | No two Cpds. in same b.p. range | Two Cpds. in same b.p. range |
|---|---|---|
| b.p. of X < Y each is in range A | P < 0.45 | P < 0.40 |
|  | 0.01 < X < 0.53 | 0.01 < X < 0.58 |
|  | 0.01 < Y < 0.53 | 0.01 < Y < 0.58 |
| b.p. of X < Y each is in range B | P < 0.46 | P < 0.40 |
|  | 0.01 < X < 0.52 | 0.01 < X < 0.57 |
|  | 0.01 < Y < 0.52 | 0.01 < Y < 0.57 |
| b.p. of X < Y and b.p. of X is in | P < 0.47 | P < 0.40 |

-continued

|  | No two Cpds. in same b.p. range | Two Cpds. in same b.p. range |
|---|---|---|
| range B, and b.p. of Y is in | 0.01 < X < 0.51 | 0.01 < X < 0.56 |
| range C | 0.01 < Y < 0.51 | 0.01 < Y < 0.56 |
| b.p. of X is at least in range B and | P < 0.50 | P < 0.45 |
| b.p. of Y is at least in range D | 0.01 < X < 0.48 | 0.01 < X < 0.53 |
|  | 0.01 < Y < 0.48 | 0.01 < Y < 0.53 |

Example 7

A nonazeotropic working fluid medium having vaporization loss stability is formulated from four compounds P,X,Y and Z and the formula $C_nH_mCl_xF_y$ wherein n is an integer, x and y are each independently integers of 0 or more, but m,x and y are not 0 at the same time. The boiling point of P is the lowest, with each of the remaining compounds X,Y and Z having a normal boiling point within one of the following seven ranges (A–G):

A. −45° to −35° C.

B. −35° to −20° C.

C. −20° to 0° C.

D. 0° to 25° C.

E. 25° to 35° C.

F. 55° to 90° C.

G. 90° to 135° C.

Accordingly, whether the boiling point of the compounds (P,X,Y,Z) is in the same range or not, two cases can be created, wherein either no two of said compounds (P,X,Y,Z) have normal boiling points within the same range or at least two have normal boiling points within the same range, but the total system does not have a boiling point within that range, whereby the concentrations of the compounds in the medium are as follows:

| | No two Cpds. in the same b.p. range | Two Cpds. in same b.p. range |
|---|---|---|
| b.p. of X < Y < Z and each is in range A | P > 0.35<br>0.01 < X < 0.60<br>0.01 < Y < 0.60<br>0.01 < Z < 0.60 | P > 0.32<br>0.01 < X < 0.63<br>0.01 < Y < 0.63<br>0.01 < Z < 0.63 |
| b.p. of X < Y < Z and each is in range B | P > 0.36<br>0.01 < X < 0.59<br>0.01 < Y < 0.59<br>0.01 < Z < 0.59 | P > 0.33<br>0.01 < X < 0.62<br>0.01 < Y < 0.62<br>0.01 < Z < 0.62 |
| b.p. of X < Y < Z and b.p.'s are in range B or at least one is in range C | P > 0.37<br>0.01 < X < 0.58<br>0.01 < Y < 0.58<br>0.01 < Z < 0.58 | P > 0.34<br>0.01 < X < 0.61<br>0.01 < Y < 0.61<br>0.01 < Z < 0.61 |
| b.p. of X < Y < Z, and b.p.'s of X and Y are at least in range B, and b.p. of Z is at least in range D | P > 0.40<br>0.01 < X < 0.55<br>0.01 < Y < 0.55<br>0.01 < Z < 0.55 | P > 0.37<br>0.01 < X < 0.58<br>0.01 < Y < 0.58<br>0.01 < Z < 0.58 |

Example 8

A nonazeotropic working fluid medium having vaporization loss stability is formulated from the compounds P,U, X,Y and Z of the formula $C_nH_mCl_xF_y$ wherein n is an integer, m,x and y are each independently integers of 0 or more, but m,x and y are not 0 at the same time. The boiling point of P is the lowest, with each of the remaining of the compounds U, X, Y and Z having a normal boiling point within one of the following seven ranges (A–G):

A. –45° to –35° C.

B. –35° to –20° C.

C. –20° to 0° C.

D. 0° to 25° C.

E. 25° to 35° C.

F. 55° to 90° C.

G. 90° to 135° C.

Accordingly, whether the boiling point of the compounds (P,U,X,Y,Z) is in the same range or not, two cases can be created, wherein either no two of said compounds (P,U,X, Y,Z) have normal boiling points within the same range or at least two have normal boiling points within the same range, but the total system does not have a boiling point within that range, whereby the concentrations of the compounds in the medium are as follows:

| | No two Cpds. in the same b.p. range | Two Cpds. in same b.p. range |
|---|---|---|
| b.p. of U < X < Y < Z and each is in range A | P > 0.33<br>0.01 < U < 0.62<br>0.01 < X < 0.62<br>0.01 < Y < 0.62<br>0.01 < Z < 0.62 | P > 0.30<br>0.01 < U < 0.65<br>0.01 < X < 0.65<br>0.01 < Y < 0.65<br>0.01 < Z < 0.65 |
| b.p. of U < X < Y < Z and each is in range B | P > 0.34<br>0.01 < U < 0.61<br>0.01 < X < 0.61<br>0.01 < Y < 0.61<br>0.01 < Z < 0.61 | P > 0.31<br>0.01 < U < 0.64<br>0.01 < X < 0.64<br>0.01 < Y < 0.64<br>0.01 < Z < 0.64 |
| b.p. of U < X < Y < Z and b.p.'s are in range B or at least one is in range C | P > 0.35<br>0.01 < U < 0.60<br>0.01 < X < 0.60<br>0.01 < Y < 0.60<br>0.01 < Z < 0.60 | P > 0.32<br>0.01 < U < 0.63<br>0.01 < X < 0.63<br>0.01 < Y < 0.63<br>0.01 < Z < 0.63 |
| b.p. of U < X < Y < Z, and b.p.'s of U, X and Y are at least in range B, and b.p. of Z is at least in range D | P > 0.38<br>0.01 < U < 0.57<br>0.01 < X < 0.57<br>0.01 < Y < 0.57<br>0.01 < Z < 0.57 | P > 0.35<br>0.01 < U < 0.60<br>0.01 < X < 0.60<br>0.01 < Y < 0.60<br>0.01 < Z < 0.60 |

Example 9

A nonazeotropic working fluid medium having vaporization loss stability is formulated from the compounds P,X1, X2,X3, . . . , Xn of the formula $C_nH_mCl_xF_y$ wherein n is the integer, m,x, and y are each independently integers of 0 or more, but m,x and y are not 0 at the same time. The boiling point of P is the lowest, with each of the remaining compounds X1, X2, X3, . . . , Xn having a normal boiling point within one of the following seven ranges (A–G):

A. –45° C. to –35° C.

B. –35° C. to –20° C.

C. –20° C. to 0° C.

D. 0° C. to 25° C.

E. 25° C. to 35° C.

F. 55° C. to 90° C.

G. 90° C. to 135° C.

Accordingly, whether the boiling point of the compounds (P,X1,X2,X3 . . . , Xn) is in the same range or not, two cases can be created, wherein either no two of said compounds (P,X1,X2,X3, . . . Xn) have normal boiling points within the same range or at least two have normal boiling points within the same range, but the total system does not have a boiling point within that range, whereby the concentrations of the compounds in the medium are as follows:

| | No two Cpds. in same b.p. range | Two Cpds. in same b.p. range |
|---|---|---|
| b.p. of<br>X1 < X2 < X3 < . . . < Xn<br>and each is in range A | P > 0.33<br>0.01 < X1 < (0.67 – N × 0.01)<br>0.01 < X2 < (0.67 – N × 0.01)<br>0.01 < X3 < (0.67 – N × 0.01)<br>0.01 < Xn < (0.67 – N × 0.01) | P > 0.30<br>0.01 < X1 < (0.70 – N × 0.01)<br>0.01 < X2 < (0.70 – N × 0.01)<br>0.01 < X3 < (0.70 – N × 0.01)<br>0.01 < Xn < (0.70 – N × 0.01) |
| b.p. of<br>X1 < X2 < X3 < . . . < Xn<br>and each is in range B | P > 0.34<br>0.01 < X1 < (0.66 – N × 0.01)<br>0.01 < X2 < (0.66 – N × 0.01)<br>0.01 < X3 < (0.66 – N × 0.01)<br>0.01 < Xn < (0.66 – N × 0.01) | P > 0.31<br>0.01 < X1 < (0.69 – N × 0.01)<br>0.01 < X2 < (0.69 – N × 0.01)<br>0.01 < X3 < (0.69 – N × 0.01)<br>0.01 < Xn < (0.69 – N × 0.01) |
| b.p. of<br>X1 < X2 < X3 < . . . < Xn,<br>with at least one in range C<br>and the others in range B | P > 0.35<br>0.01 < X1 < (0.65 – N × 0.01)<br>0.01 < X2 < (0.65 – N × 0.01)<br>0.01 < X3 < (0.65 – N × 0.01) | P > 0.32<br>0.01 < X1 < (0.68 – N × 0.01)<br>0.01 < X2 < (0.68 – N × 0.01)<br>0.01 < X3 < (0.68 – N × 0.01) |

-continued

|  | No two Cpds. in same b.p. range | Two Cpds. in same b.p. range |
|---|---|---|
| b.p. of<br>X1 < X2 < X3 < ... < Xn<br>and the b.p.'s of X1, X2,<br>X3, ..., Xi(3 < i < n) are<br>at least in range B and the<br>b.p.'s of X(i + 1), ..., Xn<br>are at least in range D | $0.01 < Xn < (0.65 - N \times 0.01)$<br>$P > 0.38$<br>$0.01 < X1 < (0.62 - N \times 0.01)$<br>$0.01 < X2 < (0.62 - N \times 0.01)$<br>$0.01 < X3 < (0.62 - N \times 0.01)$<br>$0.01 < Xn < (0.62 - N \times 0.01)$ | $0.01 < Xn < (0.68 - N \times 0.01)$<br>$P > 0.35$<br>$0.01 < X1 < (0.65 - N \times 0.01)$<br>$0.01 < X2 < (0.65 - N \times 0.01)$<br>$0.01 < X3 < (0.65 - N \times 0.01)$<br>$0.01 < Xn < (0.65 - N \times 0.01)$ |

Example 10

A nonazeotropic working fluid medium having vaporization loss stability is formulated to comprise the following compounds in the weight concentrations as follows:

| $CCl_2F_2$(R12) | 0.02–0.25 |
|---|---|
| $CHClF_2$(R22) | 0.5–0.7 |
| $CClF_2CF_3$ (R115) | 0.1–0.45 |

When each of said compounds is in the following weight concentration, the working fluid medium has the best vaporization loss stability:

| $CCl_2F_2$ (R12) | 0.14 |
|---|---|
| $CHClF_2$ (R22) | 0.59 |
| $CClF_2CF_3$ (R115) | 0.27 |

When said compounds contain less than 10 percent (by wight) of impurity, the effect on the thermophysical property of the working fluid medium can be negligible.

Example 11

A nonazeotropic working fluid medium having vaporization loss stability is formulated to comprise the following compounds in the weight concentration as follows:

| $CH(CH_3)_3$ (R600a) | 0.02–0.2 |
|---|---|
| $CHClF_2$ (R22) | 0.5–0.7 |
| $CH_3CHF_2$ (R152a) | 0.1–0.45 |

When each of said compounds is in the following weight concentration, the working fluid medium has the best vaporization loss stability:

| $CH(CH_3)_3$ (R600a) | 0.09 |
|---|---|
| $CHClF_2$ (R22) | 0.62 |
| $CH_3CHF_2$ (R152a) | 0.29 |

When said compounds contain less than 10 percent (by wight) of impurity, the effect on the thermophysical property of the working fluid medium can be negligible.

Example 12

A nonazeotropic working fluid medium having vaporization loss stability is formulated to comprise the following compounds in the weight concentrations a follows:

| $CH_3(CH_2)_2CH_3$ (R600) | 0.02–0.2 |
|---|---|
| $CHClF_2$ (R22) | 0.5–0.7 |
| $CH_3CHF_2$(R152a) | 0.1–0.45 |

When each of said compounds is in the following weight concentration, the working fluid medium has the best vaporization loss stability:

| $CH_3(CH_2)_2CH_3$ (R600) | 0.06 |
|---|---|
| $CHClF_2$(R22) | 0.63 |
| $CH_3CHF_2$(R152a) | 0.31 |

When said compounds contain less than 10 percent (by weigh) of impurity, the effect on the thermophysical property of the working fluid medium can be negligible.

Example 13

A nonazeotropic working fluid medium having vaporization loss stability is formulated to comprise the following compounds in the weight concentrations follows:

| $CCl_2F_2$ (R12) | 0.75–0.9 |
|---|---|
| $CH_3CHF_2$(R152a) | 0.02–0.2 |
| $CH(CH_3)_3$(R600a) | 0.0–0.11 |
| $CF_3CH_2F$(R134a) | 0.0–0.15 |

When each of said compounds is in the following weight concentration, the working fluid medium has the best vaporization loss stability:

| $CCl_2F_2$(R12) | 0.82 |
|---|---|
| $CH_3CHF_2$(R152a) | 0.1 |
| $CH(CH_3)_3$(R600a) | 0.03 |
| $CF_3CH_2F$(R134a) | 0.05 |

When said compounds contain less than 10 percent (by weigh) of impurity, the effect on the thermophysical property of the working fluid medium can be negligible.

Example 14

A nonazeotropic working fluid medium having vaporization loss stability is formulated to comprise the following compounds in the weight concentrations:

| $CHClF_2$(R22) | 0.35–0.55 |
|---|---|
| $CH_3CHF_2$(R152a) | 0.05–0.30 |
| $CF_3CH_2F$(R134a) | 0.05–0.30 |
| $C_4F_8$(RC318) | 0.05–0.30 |

When each of said compounds is in the following weight concentration, the working fluid medium has the best vaporization loss stability:

| | |
|---|---|
| CHClF$_2$(R22) | 0.45 |
| CH$_3$CHF$_2$(R152a) | 0.15 |
| CF$_3$CH$_2$F(R134a) | 0.27 |
| C$_4$F$_8$(RC318) | 0.13 |

When said compounds contain less than 10 percent (by weigh) of impurity, the effect on the thermophysical property of the working fluid medium can be negligible.

Example 15

A nonazeotropic working fluid medium having vaporization loss stability is formulated to comprise the following compounds in the weight concentrations:

| | |
|---|---|
| CHClF$_2$(R22) | 0.4–0.75 |
| CH$_3$CHF$_2$(R152a) | 0.0–0.2 |
| CF$_3$CH$_2$F(R134a) | 0.0–0.25 |
| C$_3$H$_8$(R290) | 0.05–0.25 |

When each of said compounds is in the following weight concentration, the working fluid medium has the best vaporization loss stability:

| | |
|---|---|
| CHClF$_2$(R22) | 0.71 |
| CH$_3$CHF$_2$(R152a) | 0.05 |
| CF$_3$CH$_2$F(R134a) | 0.09 |
| C$_3$H$_8$(R290) | 0.15 |

When said compounds contain less than 10 percent (by weigh) of impurity, the effect on the thermophysical property of the working fluid medium can be negligible.

Example 16

A nonazeotropic working fluid medium having the vaporization loss stability is formulated to comprise the following compounds in the weight concentrations:

| | |
|---|---|
| CHClF$_2$(R22) | 0.48–0.75 |
| CH$_3$CHF$_2$(R152a) | 0.05–0.35 |
| C$_4$F$_8$(RC318) | 0.05–0.35 |

When each of said compounds is in the following weight concentration, the working fluid medium has the best vaporization loss stability:

| | |
|---|---|
| CHClF$_2$(R22) | 0.70 |
| CH$_3$CHF$_2$(R152a) | 0.18 |
| C$_4$F$_8$(RC318) | 0.12 |

When said compounds contain less than 10 percent (by weigh) of impurity, the effect on the thermophysical property of the working fluid medium can be negligible.

Example 17

A nonazeotropic working fluid medium having vaporization loss stability is formulated to comprise the following compounds in the weight concentrations:

| | |
|---|---|
| CHClF$_2$(R22) | 0.35–0.80 |
| CH$_3$CHF$_2$(R152a) | 0.02–0.30 |
| CH$_3$CClF$_2$(R1426) | 0.01–0.25 |
| C$_4$F$_8$(RC318) | 0.03–0.55 |

When each of said compounds is in the following weight concentration, the working fluid medium has the best vaporization loss stability:

| | |
|---|---|
| CHClF$_2$(R22) | 0.41 |
| CH$_3$CHF$_2$(R152a) | 0.13 |
| CH$_3$CClF$_2$(R142b) | 0.12 |
| C$_4$F$_8$(RC318) | 0.34 |

EXAMPLE 18

A nonazeotropic working fluid medium having vaporization loss stability formulated to comprise the following compounds in the weight concentrations:

| | |
|---|---|
| CHClF$_2$(R22) | 0.5–0.96 |
| CH$_3$CHCH$_2$(R1270) | 0.005–0.1 |
| CH$_3$CHF$_2$(R152a) | 0.01–0.25 |

When said compounds contain less than 10 percent (by weigh) of impurity, the effect on the thermophysical property of the working fluid medium can be negligible.

EXAMPLE 19

A nonazeotropic working fluid medium having vaporization loss stability is formulated to comprise the following compounds in the weight concentrations:

| | |
|---|---|
| CHClF$_2$(R22) | 0.89 |
| CH$_3$CHCH$_2$(R1270) | 0.03 |
| CH$_3$CHF$_2$(R152a) | 0.08 |

When said compounds contain less than 10 percent (by weigh) of impurity, the effect on the thermophysical property of the working fluid medium can be negligible.

The non-azeotropic fluid working medium, apparatus and method disclosed hereinabove are intended to be descriptive, rather than limitative of the scope of the present invention as defined in the following claims.

What is claimed is:

1. A nonazeotropic working fluid medium for use in a thermodynamic cycle system, comprising a mixture of compounds and characterized in that, when subject to one or more vaporization loss/replenishment cycles,:

(a) the weight of the medium changes is less than about 15% of the total original weight of the medium per cycle, wherein the compounds and their weight concentrations are as follows:

| | |
|---|---|
| CHClF$_2$(R22) | 0.48–0.75 |
| CH$_3$CHF$_2$(R152a) | 0.05–0.35 |
| C$_4$F$_8$(R318) | 0.05–0.35 | and wherein the maximum concentration of impurities in the medium is about 10 percent by weight; and (b) cumulatively, over all cycles, the weight of the medium changes is no more than about 50% of the total original weight of the medium, resulting in:

i) a total decrease in the coefficient of performance of said medium of no more than about 5%; or ii) a loss in electric power generating efficiency of not more than about 3 percent.

2. A nonazeotropic working fluid medium according to claim 1, wherein the compounds and their weight concentrations are as follows:

| | |
|---|---|
| $CHClF_2$(R22) | 0.70 |
| $CH_3CHF_2$(R152a) | 0.18 |
| $C_4F_8$(R318) | 0.12. |

* * * * *

UNITED STATES PATENT AND TRADEMARK OFFICE
CERTIFICATE OF CORRECTION

PATENT NO. : 5,792,381

DATED : August 11, 1998

INVENTOR(S) : Chujun GU

It is certified that error appears in the above-identified patent and that said Letters Patent is hereby corrected as shown below:

At column 14, line 4, please change "$CH_3CClF_2(R1426)$" to -- $CH_3CClF_2(R142b)$ --.

Signed and Sealed this

Twenty-ninth Day of June, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,792,381

DATED : August 11, 1998

INVENTOR(S) : Chujun GU

It is certified that errors appear in the above-identified patent and that said Letters Patent is hereby corrected as shown below:

At column 14, line 65, please change "(R318)" to -- (RC318) --; and

At column 16, line 8, please change "(R318)" to -- (RC318) --.

Signed and Sealed this

Twenty-eighth Day of November, 2000

Attest:

Q. TODD DICKINSON

*Attesting Officer*  *Director of Patents and Trademarks*